(12) United States Patent
Wang et al.

(10) Patent No.: US 8,130,615 B2
(45) Date of Patent: Mar. 6, 2012

(54) DEVICE AND METHOD FOR GENERATING TRACK-CROSSING SIGNAL IN OPTICAL DISC DRIVE

(75) Inventors: Sih-Kai Wang, Tainan (TW); Hsing-Sheng Huang, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 552 days.

(21) Appl. No.: 12/262,325

(22) Filed: Oct. 31, 2008

(65) Prior Publication Data

US 2009/0122678 A1     May 14, 2009

(30) Foreign Application Priority Data

Nov. 9, 2007  (TW) ............................. 96142522 A (51) Int. Cl.
*G11B 7/00*     (2006.01)
(52) U.S. Cl. .................................. 369/53.23; 369/53.15
(58) Field of Classification Search ............... 369/53.15, 369/53.17, 53.18, 44.27, 53.23
See application file for complete search history.

(56) References Cited

U.S. PATENT DOCUMENTS

| | | | |
|---|---|---|---|
| 5,612,933 A * | 3/1997 | Iso et al. | 369/44.27 |
| 5,867,461 A * | 2/1999 | Baas | 369/44.32 |
| 6,967,906 B2 | 11/2005 | Park et al. | |
| 2003/0133374 A1* | 7/2003 | Murata et al. | 369/44.35 |
| 2006/0087937 A1* | 4/2006 | Maruyama et al. | 369/47.1 |
| 2006/0215519 A1* | 9/2006 | Lai et al. | 369/53.15 |

* cited by examiner

*Primary Examiner* — Latanya Bibbins
(74) *Attorney, Agent, or Firm* — WPAT., P.C.; Justin King (57) ABSTRACT

A track-crossing signal generator includes a bottom envelope detecting unit, a defect detector, an auto gain control unit, and an amplifier. The bottom envelope detecting unit receives a radio frequency signal, and outputs a bottom envelope signal. The defect detector is electrically connected to the bottom envelope detecting unit for receiving the bottom envelope signal and generating a defect signal when a defect area is formed on a disc track. The auto gain control unit is electrically connected to the bottom envelope detecting unit for receiving the bottom envelope signal and dynamically adjusting a gain value according to the amplitude of the bottom envelope signal. The amplifier is electrically connected to the bottom envelope detecting unit and the auto gain control unit for receiving the bottom envelope signal and dynamically adjusting the bottom envelope signal according to the gain value, thereby amplifying the bottom envelope signal as a track-crossing signal.

9 Claims, 13 Drawing Sheets

DEVICE AND METHOD FOR GENERATING TRACK-CROSSING SIGNAL IN OPTICAL DISC DRIVE

FIELD OF THE INVENTION

The present invention relates to a device and a method for generating a signal in an optical disc drive, and more particularly to a device and a method for generating a track-crossing signal in an optical disc drive.

BACKGROUND OF THE INVENTION

Generally, data on an optical disc are recorded around a series of concentric circular tracks in a spiral arrangement. For reading data from the tracks of the optical disc, an optical pickup head is driven to see tracks by a sled motor. By using a suitable servo control system, the optical pickup head is properly located above the desired track.

When an electronic signal is generated responsive to an optical signal reflected from the optical disc and received by a four-quadrant photodiode of the optical pickup head, the electronic signal is transmitted to a radio frequency (RF) amplifier to be processed into a radio frequency (RF) signal. By a track-crossing signal generator, the RF signal is then processed into a track-crossing signal. According to a proper slicing level, the track-crossing signal is processed into a sliced track-crossing signal. As the RF signal is changed during track-crossing, the track-crossing signal and the sliced track-crossing signal are changed correspondingly. According to the track-crossing signal and the sliced track-crossing signal, the servo processor performs a track-crossing control operation and a track-following control operation.

Figure 1:
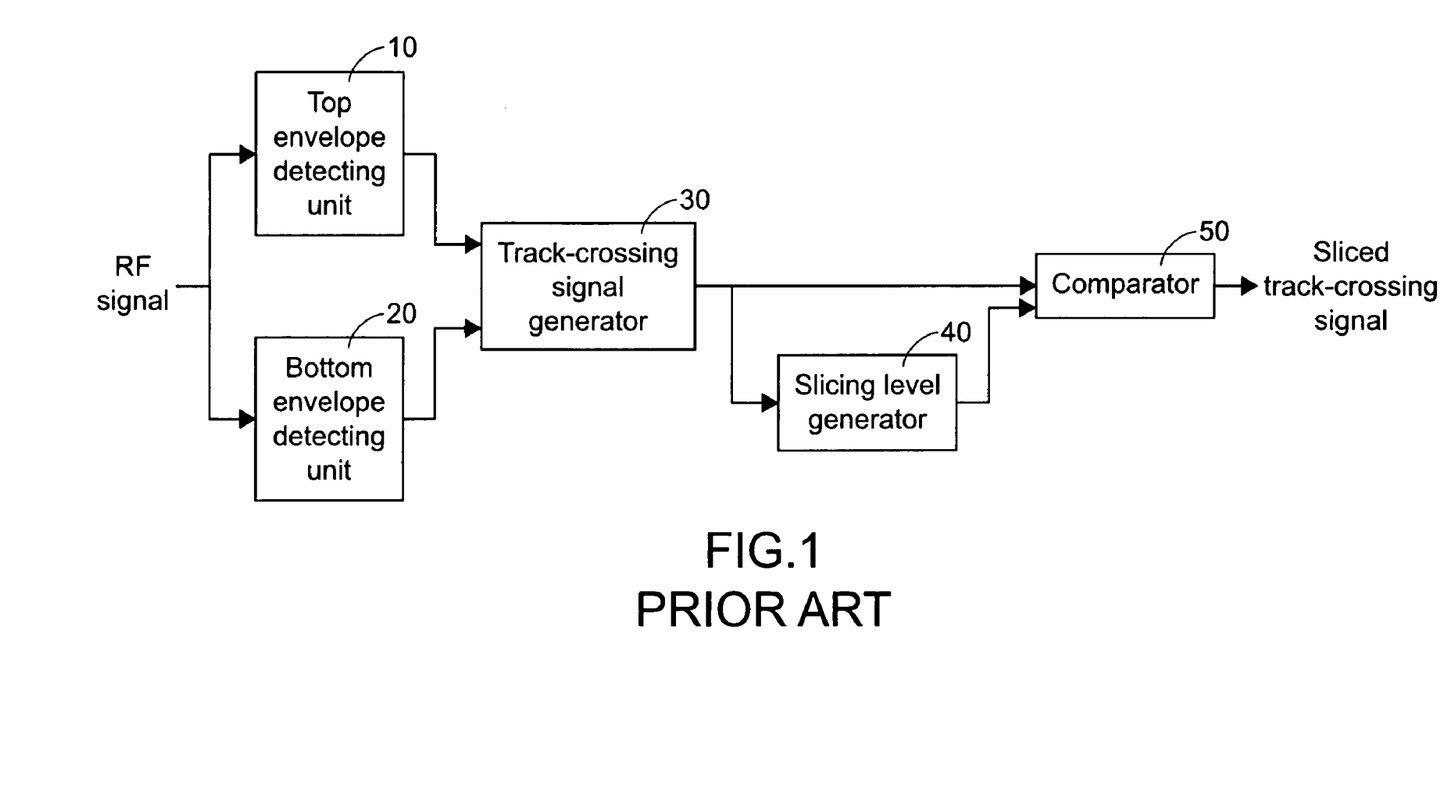
FIG. 1 schematically illustrates a circuit diagram of a sliced track-crossing signal generator according to prior art.

FIG. 1 schematically illustrates a circuit diagram of a sliced track-crossing signal generator according to prior art. The sliced track-crossing signal generator principally includes a top envelope detecting unit 10, a bottom envelope detecting unit 20, a track-crossing signal generator 30, a slicing level generator 40 and a comparator 50. A RF signal is simultaneously inputted into the top envelope detecting unit 10 and the bottom envelope detecting unit 20. The top envelope detecting unit 10 detects the top envelope of the RF signal and outputs a top envelope signal. The bottom envelope detecting unit 20 detects the bottom envelope of the RF signal and outputs a bottom envelope signal. The track-crossing signal generator 30 subtracts the bottom envelope signal from the top envelope signal, thereby outputting a track-crossing signal. According to the track-crossing signal, the slicing level generator 40 issues a slicing level. The comparator 50 compares the track-crossing signal with the slicing level, thereby generating a sliced track-crossing signal.

Figure 2:
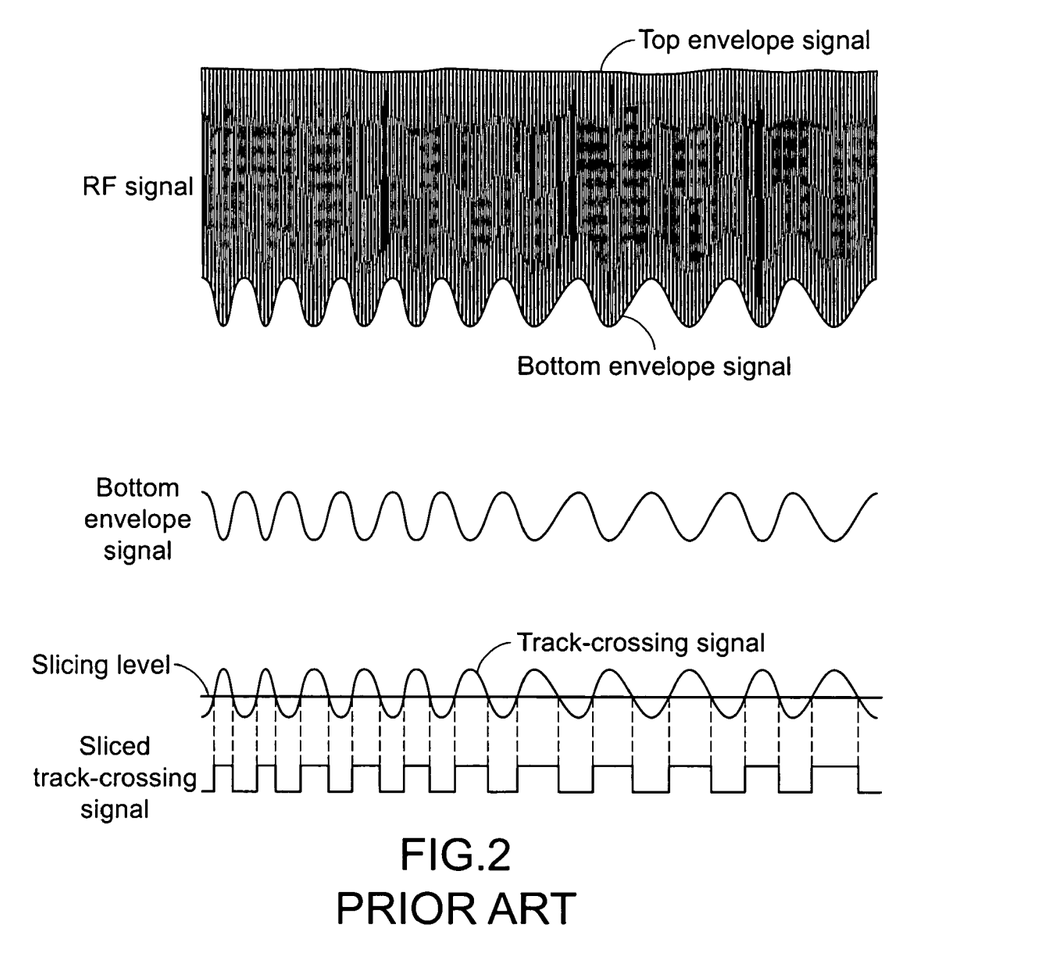
FIG. 2 is a timing waveform diagram illustrating related signals processed in the sliced track-crossing signal generator of FIG. 1.

FIG. 2 is a timing waveform diagram illustrating relations between the RF signal, the top envelope signal, the bottom envelope signal, the track-crossing signal, the slicing level and the sliced track-crossing signal. Generally, when the optical pickup head jumps from one track to another track, the bottom envelope signal is varied with change of the focusing position of the laser beam on the optical disc. As shown in FIG. 2, the top envelope signal is substantially kept unchanged. When the laser beam focuses between any two adjacent tracks, the bottom envelope signal has a local maximum value. Whereas, when the laser beam focuses on the track, the bottom envelope signal has a local minimum value. In other words, the bottom envelope signal varies as the focusing position of the laser beam changes.

Please refer to FIGS. 1 and 2 again. The track-crossing signal is generated from the track-crossing signal generator 30 by subtracting the bottom envelope signal from the top envelope signal. The slicing level is generated from the slicing level generator 40 according to the track-crossing signal. The sliced track-crossing signal is outputted from the comparator 50 by comparing the track-crossing signal with the slicing level.

In the servo control system of the optical disc drive, the position of the optical pickup head and the number of jumped tracks are determined according to the sliced track-crossing signal. For example, a pulse of the sliced track-crossing signal is resulted when the optical pickup head jumps from a track to an adjacent track. By counting the pulse number of the sliced track-crossing signal, the number of tracks which are jumped is determined. Moreover, when the sliced track-crossing signal is at the high-level state, the laser beam is focused on the track. On the contrary, the laser beam is not focused on the track when the sliced track-crossing signal is at the low-level state.

As known, due to production failure, fingerprints, dust or scratch, some defects are readily formed on the surface of the optical disc. Due to the defects, the RF signal is deteriorated. The deteriorated RF signal may deteriorate the top envelope signal. According to the deteriorated RF signal, an erroneous sliced track-crossing signal is generated from the comparator 50. Under this circumstance, the servo control system of the optical disc drive fails to accurately realize the position of the optical pickup head and the number of jumped tracks and thus results in track crossing failure.

For addressing the problems described above, a circuit and a method of detecting a mirror signal for an optical disc apparatus have been disclosed in U.S. Pat. No. 6,967,906. The term "mirror signal" used in this publication corresponds to the sliced track-crossing signal described in FIG. 1 and FIG. 2. The sliced track-crossing signal is generated according to the bottom envelope signal without referring to the top envelope signal.

Figure 3:
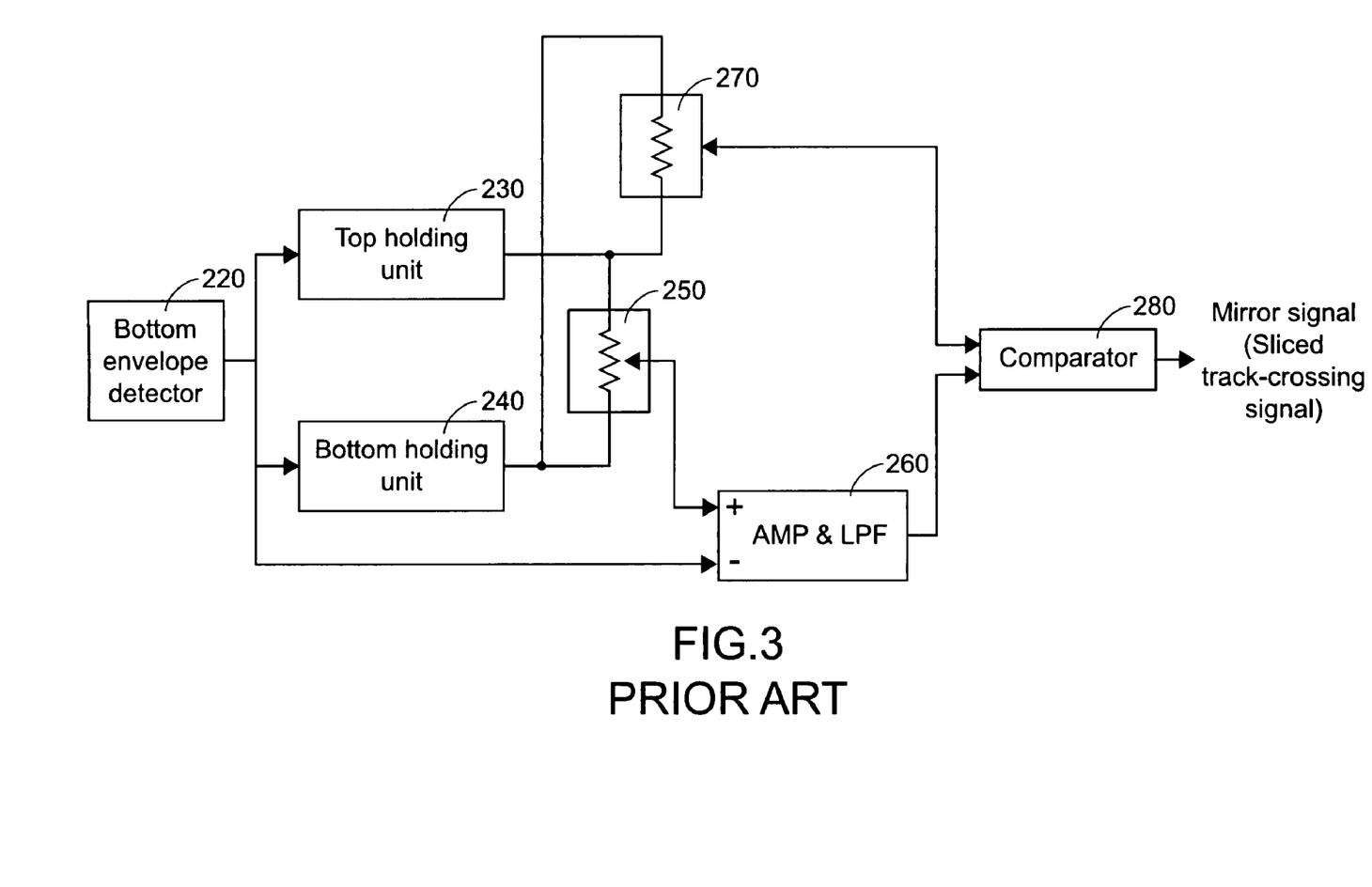
FIG. 3 a circuit diagram of a sliced track-crossing signal generator disclosed in U.S. Pat. No. 6,967,906.

FIG. 3 a circuit diagram of a sliced track-crossing signal generator disclosed in U.S. Pat. No. 6,967,906. As shown in FIG. 3, the sliced track-crossing signal generator principally includes a bottom envelope detector 220, a top holding unit 230, a bottom holding unit 240, a center level detector 250, an amplifier and low-pass filter (AMP & LPF) 260, a comparison voltage determiner 270 and a comparator 280. The bottom envelope detector 220 detects a bottom envelope of the RF signal and outputs a bottom envelope signal. The bottom envelope signal is transmitted to the top holding unit 230, the bottom holding unit 240 and the AMP & LPF 260. The top holding unit 230 detects and holds a top level of the bottom envelope signal and outputs a top holding signal. The bottom holding unit 240 detects and holds a bottom level of the bottom envelope signal and outputs a bottom holding signal.

The center level detector 250 detects a center level of the top holding signal and the bottom holding signal. The comparison voltage determiner 270 can output a comparison voltage, which is controlled to have a level between the top holding signal and the bottom holding signal. When the bottom envelope signal and the center level are received by the AMP & LPF 260, the bottom envelope signal is amplified into an amplified bottom envelope signal. The comparator 280 compares the level of the amplified bottom envelope signal with the level of the comparison voltage and outputs a mirror signal (or a sliced track-crossing signal). In the servo control system of the optical disc drive, the position of the optical pickup head and the number of jumped tracks can be determined according to the mirror signal. Moreover, the comparison voltage can be considered as a slicing level.

FIGS. 4A, 4B, 4C, 4D and 4E are timing waveform diagrams illustrating relations between the RF signal, the bottom envelope signal, the top holding signal, the bottom holding signal, the amplified bottom envelope signal, the center level, the comparison voltage and the mirror signal processed in the sliced track-crossing signal generator of FIG. 3.

Figure 4A:
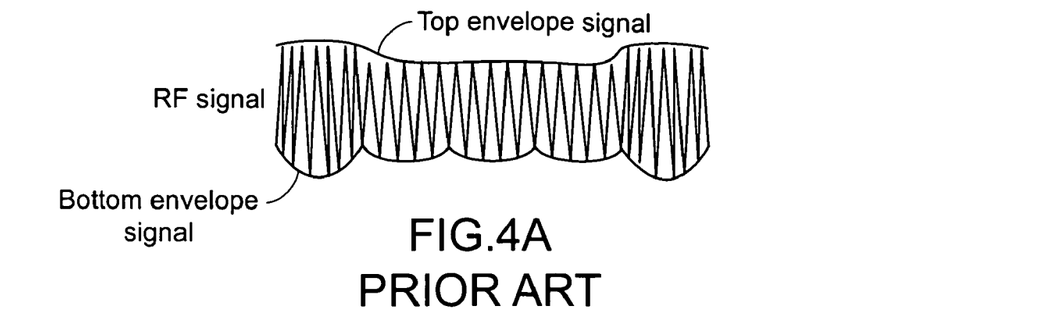
FIGS. 4A, 4B, 4C, 4D and 4E are timing waveform diagrams illustrating related signals processed in the sliced track-crossing signal generator of FIG. 3.

As previously described, the RF signal is possibly deteriorated by the some defects (e.g. fingerprint, dust or scratch). As shown in FIG. 4A, the waveform of the top envelope signal is distorted due to the deteriorated RF signal but the influence of the deteriorated RF signal on the bottom envelope signal is negligible.

Figure 4B:
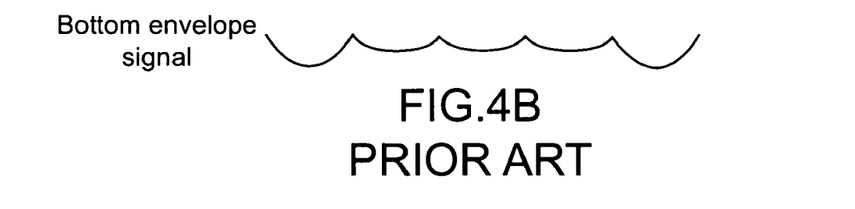

As shown in FIG. 4B, the bottom envelope signal has a local minimum value when the laser beam is focused on the track. When the laser beam is focused between any two adjacent tracks, the bottom envelope signal is varied with change of the focusing position of the laser beam.

Figure 4C:
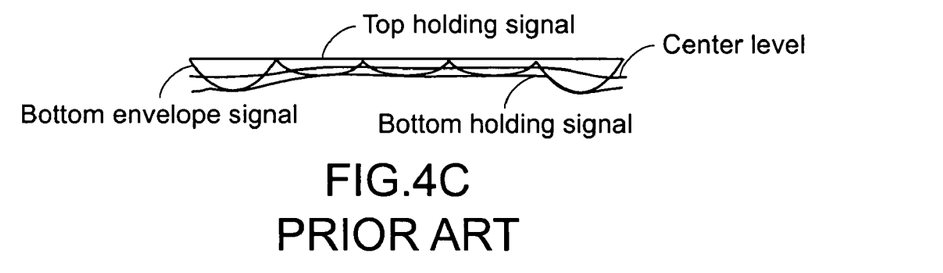

As shown in FIG. 4C, the top holding signal issued from the top holding unit 230 is held at the top level of the bottom envelope signal and the bottom envelope signal issued from the bottom holding unit 240 is held at the bottom level of the bottom envelope signal. The center level is the average of the top level and the bottom level of the bottom envelope signal.

Figure 4D:
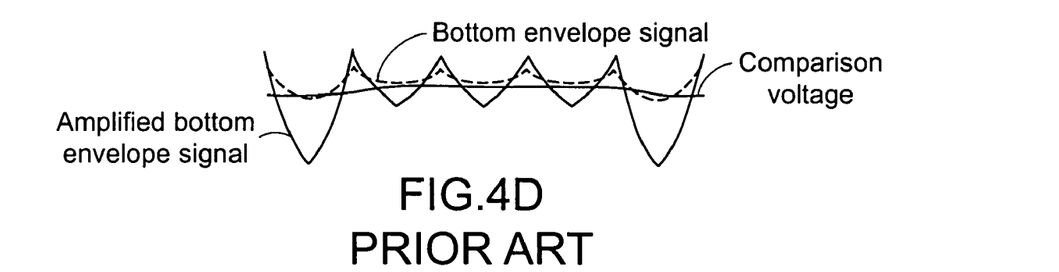

In FIG. 4D, the amplified bottom envelope signal and the comparison voltage are schematically illustrated.

Figure 4E:
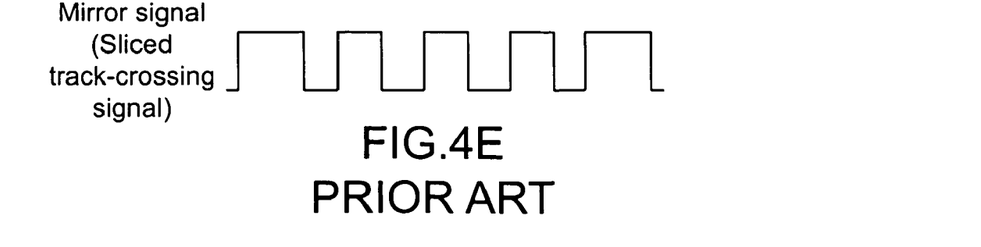

The sliced track-crossing signal generated by comparing the level of the amplified bottom envelope signal with the level of the comparison voltage is shown in FIG. 4E.

The sliced track-crossing signal generator disclosed in U.S. Pat. No. 6,967,906 is effective for improving the track crossing performance of the optical disc deteriorated by the dark defect. This technology, however, fails to be applied to avoid the track crossing failure the optical disc deteriorated by the deep defect or the bright defect.

FIGS. 5A, 5B, 5C and 5D are timing waveform diagrams illustrating relations between the RF signal, the bottom envelope signal, the top holding signal, the bottom holding signal, the center level and the mirror signal processed in the sliced track-crossing signal generator of FIG. 3, in which a deep defect area is present on the disc track.

Figure 5A:
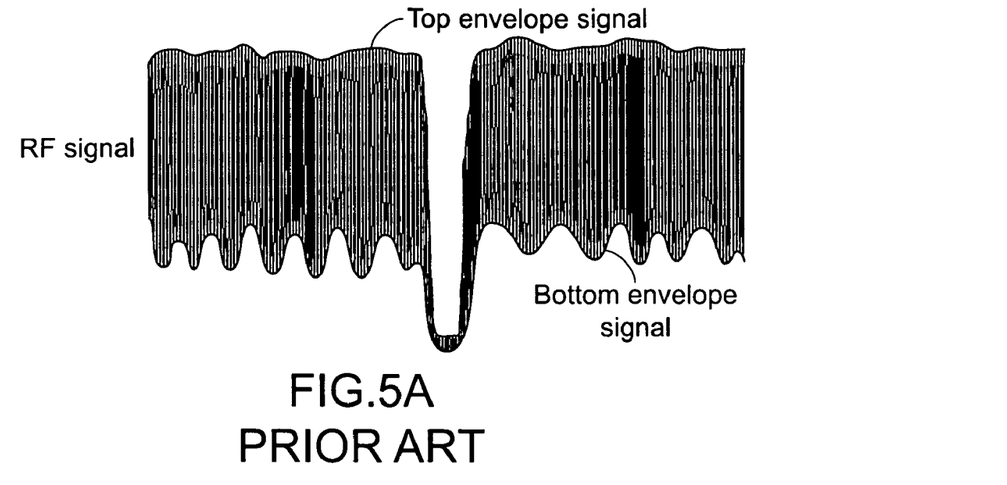
FIGS. 5A, 5B, 5C and 5D are timing waveform diagrams illustrating related signals processed in the sliced track-crossing signal generator of FIG. 3, in which a deep defect area is present on the disc track.
Figure 5B:
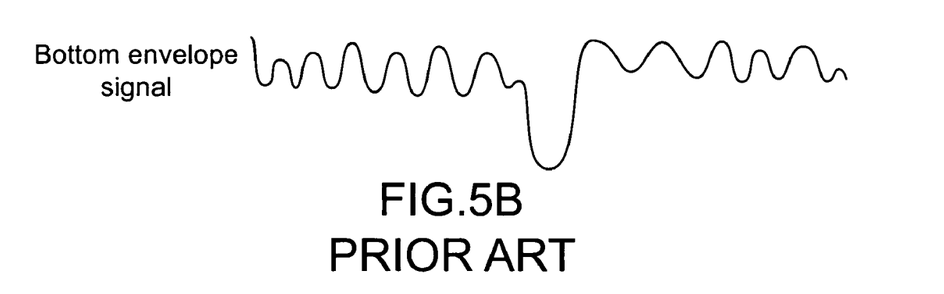

In a case that the optical pickup head is moved along a track having a deep defect area with no reflection, as shown in FIG. 5A, the RF signal abruptly drops down. That is, when the focusing spot is located on the deep defect area, the RF signal is totally distorted. The bottom envelope signal issued from the bottom envelope detector 220 is shown in FIG. 5B.

Figure 5C:
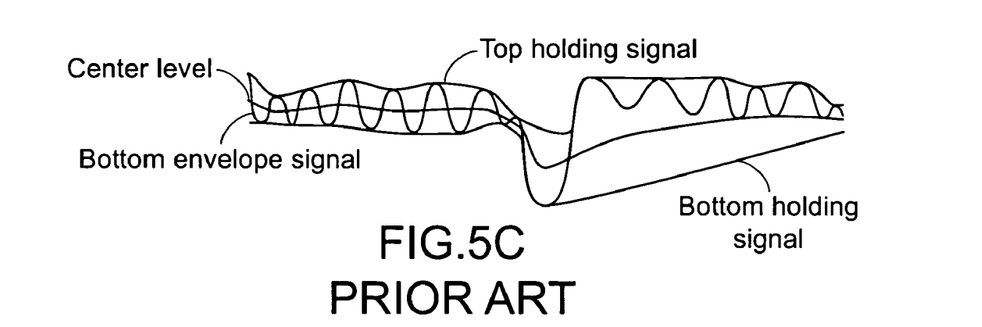
Figure 5D:
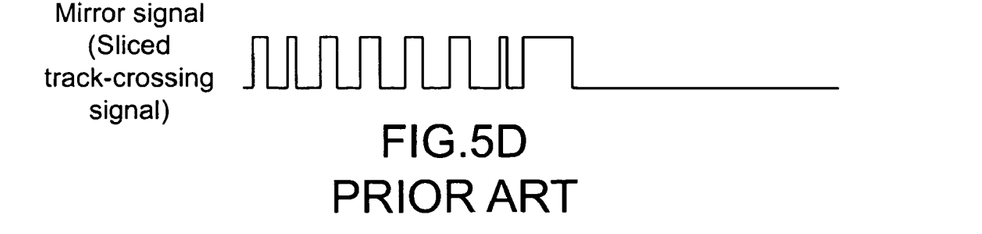

As shown in FIG. 5C, the top holding signal issued from the top holding unit 230 is held at the top level of the bottom envelope signal and the bottom envelope signal issued from the bottom holding unit 240 is held at the bottom level of the bottom envelope signal. The center level is the average of the top level and the bottom level of the bottom envelope signal. The sliced track-crossing signal generated from the comparator 280 is shown in FIG. 5D.

As can be seen from FIG. 5C, after the focusing spot passes across the deep defect area, the center level is greatly biased from the normal level and fails to return to the normal level in a short term because the bottom holding signal is suffered from a great variation. As a consequence, the center level and the comparison voltage are suffered from great variations. By using the comparison voltage as a slicing level, the comparator 280 will output erroneous pulses of the sliced track-crossing signal after the focusing spot passes across the deep defect area, as can be seen in FIG. 5D. Under this circumstance, the number of tracks which are jumped is erroneously determined and thus track crossing failure is resulted.

FIGS. 6A, 6B, 6C and 6D are timing waveform diagrams illustrating relations between the RF signal, the bottom envelope signal, the top holding signal, the bottom holding signal, the center level and the mirror signal processed in the sliced track-crossing signal generator of FIG. 3, in which a bright defect area is present on the disc track.

Figure 6A:
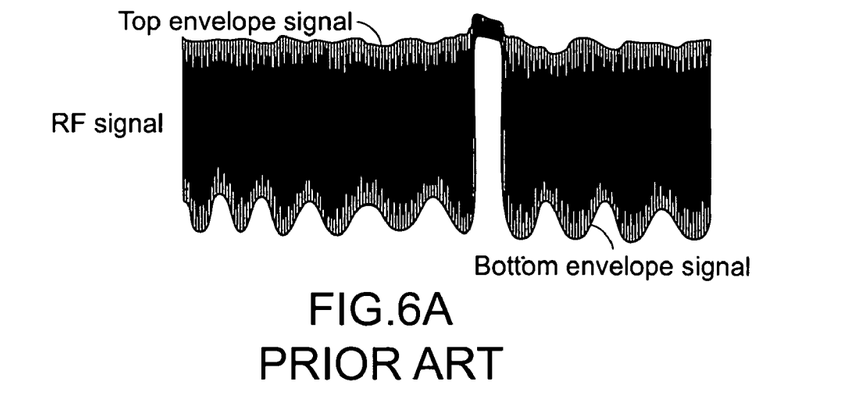
FIGS. 6A, 6B, 6C and 6D are timing waveform diagrams illustrating related signals processed in the sliced track-crossing signal generator of FIG. 3, in which a bright defect area is present on the disc track.
Figure 6B:
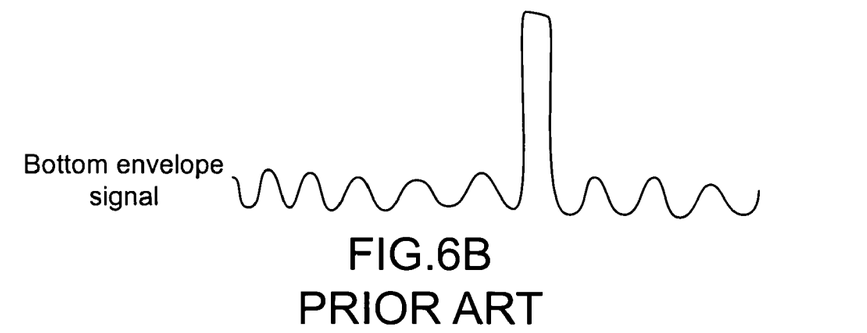

In a case that the optical pickup head is moved along a track having a bright defect area with strong reflection, as shown in FIG. 6A, the RF signal abruptly rises up. That is, when the focusing spot is located on the bright defect area, the RF signal is totally distorted. The bottom envelope signal issued from the bottom envelope detector 220 is shown in FIG. 6B.

Figure 6C:
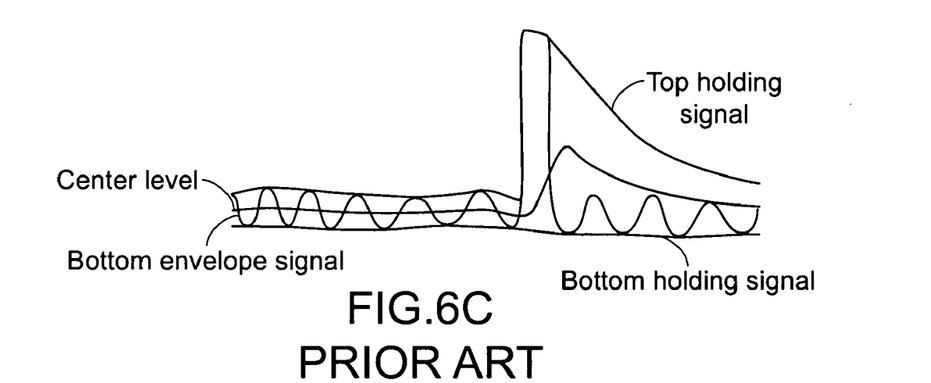
Figure 6D:
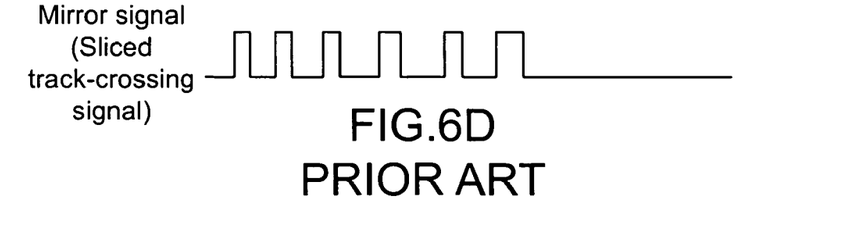

As shown in FIG. 6C, the top holding signal issued from the top holding unit 230 is held at the top level of the bottom envelope signal and the bottom envelope signal issued from the bottom holding unit 240 is held at the bottom level of the bottom envelope signal. The center level is the average of the top level and the bottom level of the bottom envelope signal. The sliced track-crossing signal generated from the comparator 280 is shown in FIG. 6D.

As can be seen from FIG. 6C, after the focusing spot passes across the bright defect area, the center level is greatly biased from the normal level and fails to return to the normal level in a short term because the top holding signal is suffered from a great variation. As a consequence, the center level and the comparison voltage are suffered from great variations. By using the comparison voltage as a slicing level, the comparator 280 will output erroneous pulses of the sliced track-crossing signal after the focusing spot passes across the bright defect area, as can be seen in FIG. 6D. Under this circumstance, the number of tracks which are jumped is erroneously determined and thus track crossing failure is resulted.

As previously described, the bottom holding signal or the top holding signal is readily suffered from a great variation when the optical pickup head is moved along a track having a deep defect area or a bright defect area. Since the center level and the comparison voltage are suffered from great variations, the servo control system of the optical disc drive is unstable, which may cause the optical pickup head to have slip track. Eventually, these defects could result in reading or writing errors.

Therefore, there is a need of providing a device and a method for generating a track-crossing signal in an optical disc drive so as to obviate the drawbacks encountered from the prior art.

SUMMARY OF THE INVENTION

The present invention provides a device and a method for generating a track-crossing signal in an optical disc drive so as to accurately obtain the track-crossing signal and the sliced track-crossing signal after the focusing spot of the laser beam passes across the deep defect area.

In accordance with a first aspect of the present invention, there is provided a track-crossing signal generator for use in an optical disc drive. The track-crossing signal generator includes a bottom envelope detecting unit, a defect detector, an auto gain control unit, and an amplifier. The bottom envelope detecting unit receives a radio frequency signal, and outputs a bottom envelope signal. The defect detector is electrically connected to the bottom envelope detecting unit for receiving the bottom envelope signal. The defect detector generates a defect signal when a defect area is formed on a disc track. The auto gain control unit is electrically connected to the bottom envelope detecting unit for receiving the bottom envelope signal and dynamically adjusting a gain value according to the amplitude of the bottom envelope signal. The amplifier is is electrically connected to the bottom envelope detecting unit and the auto gain control unit for receiving the bottom envelope signal and dynamically adjusting the bottom envelope signal according to the gain value, thereby amplifying the bottom envelope signal as a track-crossing signal.

In accordance with a second aspect of the present invention, there is provided a track-crossing signal generating method for use in an optical disc drive. The track-crossing signal generating method includes steps of providing a radio frequency signal; generating a bottom envelope signal according to the radio frequency signal; generating a defect signal when the bottom envelope signal is larger than a first threshold value or smaller than a second threshold value, wherein the first threshold value is larger than the second threshold value; and dynamically adjusting the bottom envelope signal as a track-crossing signal.

In accordance with a third aspect of the present invention, there is provided a track-crossing signal generator for use in an optical disc drive. The track-crossing signal generator includes a bottom envelope detecting unit, a defect detector, an auto gain control unit, and an amplifier. The bottom envelope detecting unit receives a radio frequency signal, and outputs a bottom envelope signal. The defect detector receives the bottom envelope signal and generates a defect signal when a defect area is formed on a disc track. The auto gain control unit is electrically connected to the bottom envelope detecting unit for receiving the bottom envelope signal and dynamically adjusting a gain value according to the amplitude of the bottom envelope signal. The amplifier is electrically connected to the bottom envelope detecting unit and the auto gain control unit for receiving the bottom envelope signal and dynamically adjusting the bottom envelope signal according to the gain value, thereby amplifying the bottom envelope signal as a track-crossing signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention.

Figure 7:
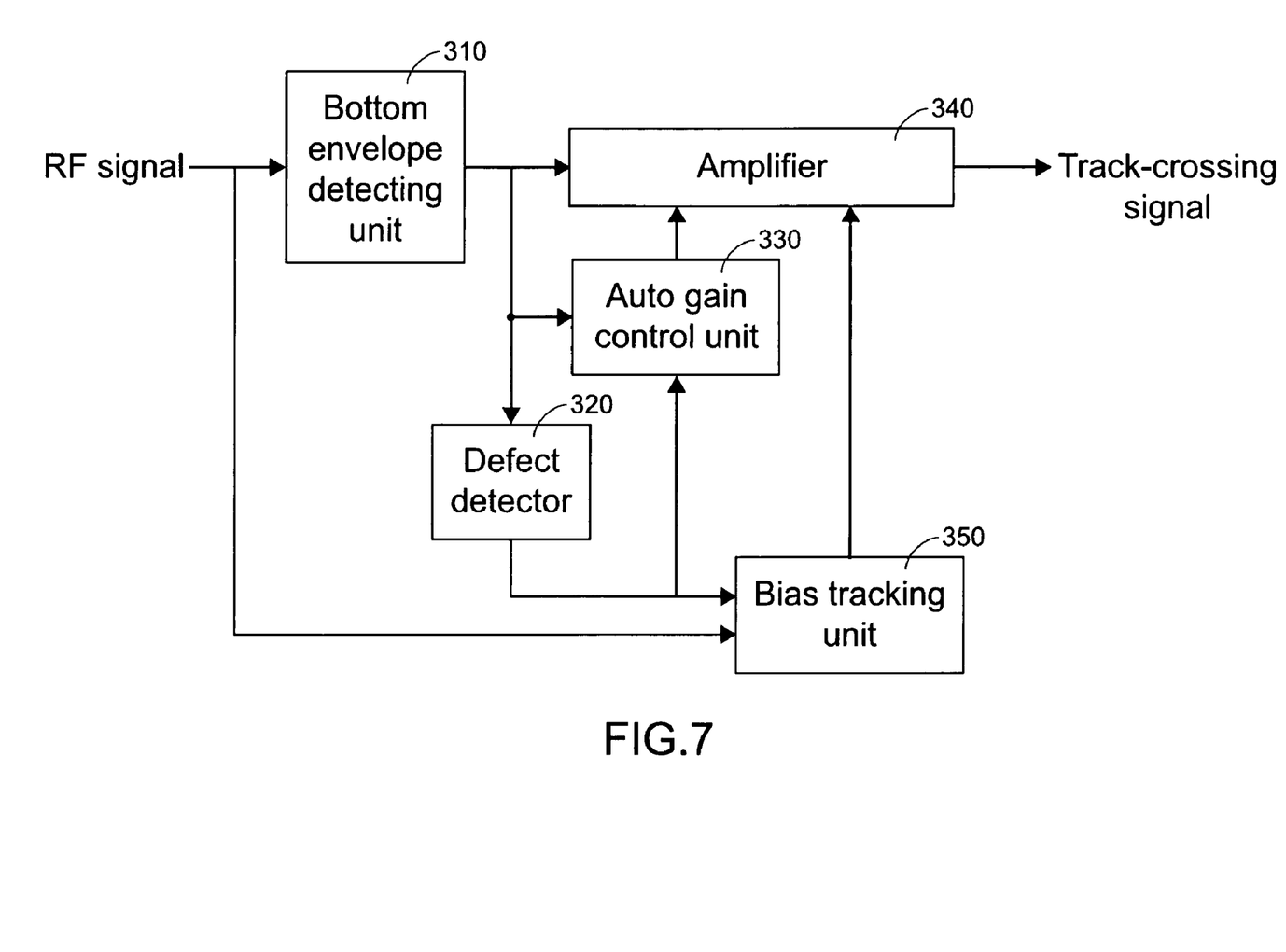
FIG. 7 schematically illustrates a circuit diagram of a track-crossing signal generator according to a first preferred embodiment of the present invention.

FIG. 7 schematically illustrates a circuit diagram of a track-crossing signal generator according to a first preferred embodiment of the present invention. The track-crossing signal generator of FIG. 7 principally includes a bottom envelope detecting unit 310, a defect detector 320, an auto gain control unit 330, an amplifier 340 and a bias tracking unit 350. After a RF signal is received by the bottom envelope detecting unit 310, the bottom envelope detector 310 detects a bottom envelope of the RF signal and outputs a bottom envelope signal to the amplifier 340, the defect detector 320 and the auto gain control unit 330. The RF signal is also inputted into the bias tracking unit 350. The bias tracking unit 350 tracks the bias of the RF signal, thereby outputting the bias to the amplifier 340. For example, the magnitude of the bias is equal to a difference between a minimum value of the RF signal and a reference level (e.g. a zero voltage level).

The auto gain control unit 330 is electrically connected to the bottom envelope detecting unit 310. According to the peak-to-peak amplitude of the bottom envelope signal, a dynamically variable gain is generated from the auto gain control unit 330 to the amplifier 340. According to the dynamically variable gain, the bottom envelope signal is amplified by the amplifier 340, so that the top level and the bottom level of the amplified bottom envelope signal are maintained within a full range and close to the top and bottom boundaries.

The defect detector 320 is electrically connected to the bottom envelope detecting unit 310 for detecting the bottom envelope signal. According to the bottom envelope signal, the defect detector 320 discriminates whether a deep defect area or a bright defect area is formed on the track. In this embodiment, the defect detector 320 discriminates whether a deep defect area or a bright defect area is formed on the track by referring to two threshold values, in which the first threshold value is larger than the second threshold value. In a case that the bottom envelope signal is larger than the first threshold value, the defect detector 320 discriminates the beginning of a bright defect area. Until the bottom envelope signal is smaller than the first threshold value, the defect detector 320 discriminates the end of the bright defect area. On the other hand, in a case that the bottom envelope signal is smaller than the second threshold value, the defect detector 320 discriminates the beginning of a deep defect area. Until the bottom envelope signal is larger than the second threshold value, the defect detector 320 discriminates the end of the deep defect area. When the defect detector 320 discriminates the presence of the deep defect area or the bright defect area, a defect signal is asserted from the defect detector 320 to the auto gain control unit 330 and the bias tracking unit 350.

In the above embodiment, the defect detector 320 discriminates whether a deep defect area or a bright defect area is formed on the track according to the bottom envelope signal. Alternatively, the defect detector 320 may discriminate the presence of the deep defect area or the bright defect area according to the RF signal.

When the defect signal is received by the bias tracking unit 350, the bias outputted from the bias tracking unit 350 is kept unchanged until end of the bright defect area or the deep defect signal. By protecting the bias from abrupt increase or abrupt decrease when a bright defect area or a deep defect area is present, the track-crossing signal would be accurately generated. Moreover, when the defect signal is received by the auto gain control unit 330, the gain value outputted from the auto gain control unit 330 is kept unchanged until the end of the bright defect area or the deep defect signal. By protecting the gain value from abrupt increase or abrupt decrease when the bottom envelope signal abruptly rises up or drops down, the track-crossing signal would be accurately generated.

When the bottom envelope signal is received by the amplifier 340, the amplifier 340 subtracts the bias from the bottom envelope signal so that the minimum value of the bottom envelope signal is close to the reference level (e.g. a zero voltage level). According to the gain value outputted from the auto gain control unit 330, the peak-to-peak amplitude of the bottom envelope signal is amplified by the amplifier 340 so that the top level and the bottom level of the amplified bottom envelope signal are maintained within a full range and close to the top and bottom boundaries. The amplified bottom envelope signal is considered as the track-crossing signal.

By comparing the track-crossing signal with a slicing level, a sliced track-crossing signal is generated. The slicing level can be either constant or variable with the bottom envelope signal. In this embodiment, the magnitude of the slicing level lies within the full range. For example, the slicing level is the average of the full range.

Figure 8:
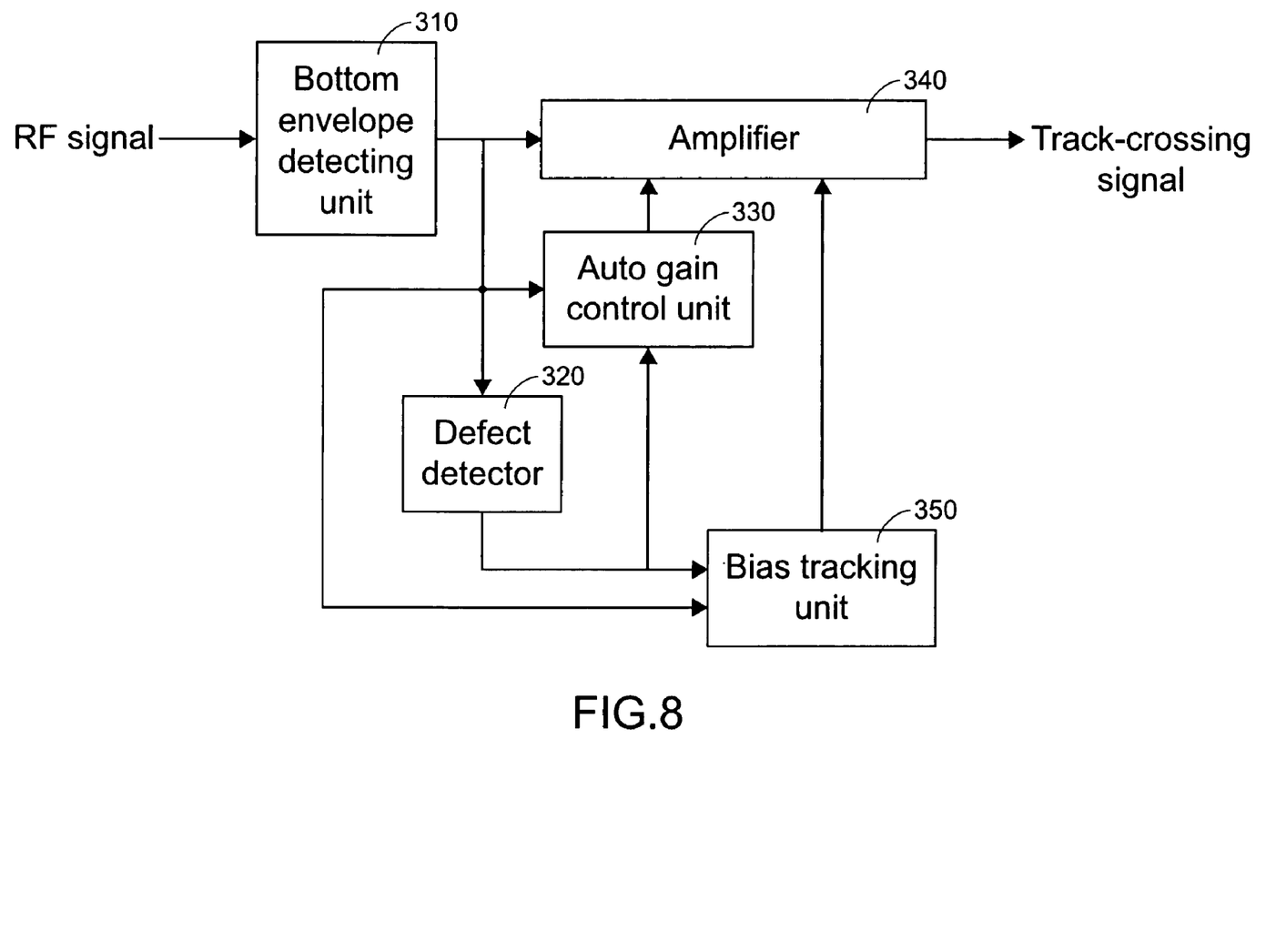
FIG. 8 schematically illustrates a circuit diagram of a track-crossing signal generator according to a second preferred embodiment of the present invention.

Another embodiment of a track-crossing signal generator according to the present invention is illustrated in FIG. 8. The bottom envelope detecting unit 310, the defect detector 320, the auto gain control unit 330, the amplifier 340 and the bias tracking unit 350 illustrated in FIG. 8 are identical to those shown in FIG. 7, and are not redundantly described herein. Instead of receiving the RF signal, the bias tracking unit 350 of FIG. 8 receives the bottom envelope signal. The bias tracking unit 350 tracks the bias of the bottom envelope signal, thereby outputting the bias to the amplifier 340. For example, the magnitude of the bias is equal to a difference between a minimum value of the bottom envelope signal and a reference level (e.g. a zero voltage level).

FIGS. 9A, 9B, 9C and 9D are timing waveform diagrams illustrating related signals processed in the track-crossing signal generator of FIG. 7 and FIG. 8.

Figure 9A:
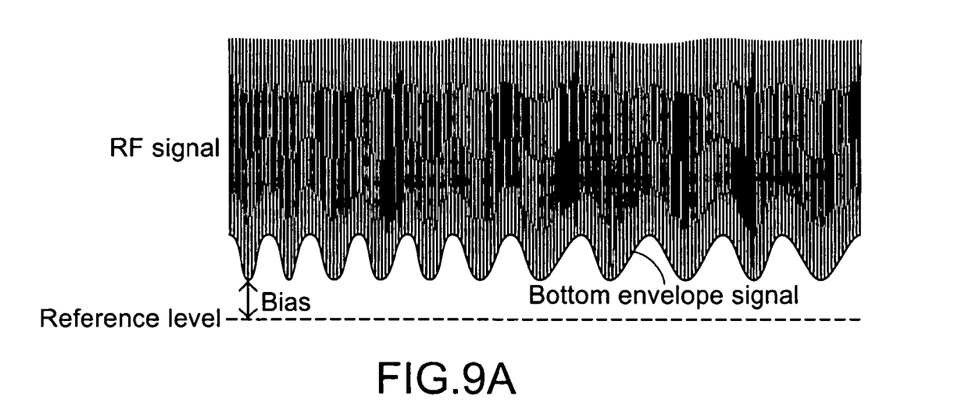
FIGS. 9A, 9B, 9C and 9D are timing waveform diagrams illustrating related signals processed in the track-crossing signal generator of FIG. 7 and FIG. 8.

As shown in FIG. 9A, when the optical pickup head jumps from one track to another track, the bottom envelope signal outputted from the bottom envelope detecting unit 310 is varied as the focusing position of the laser beam on the optical disc changes. As shown in FIG. 2, the top envelope signal is substantially kept unchanged. The magnitude of the bias is equal to a difference between the minimum value of the RF signal (see FIG. 7) or the bottom envelope signal (see FIG. 8) and a reference level (e.g. a zero voltage level).

Figure 9B:
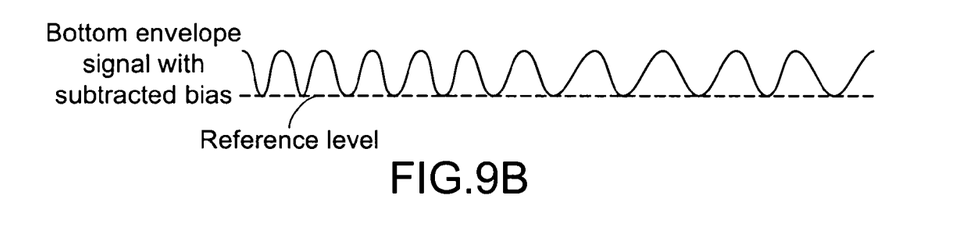

As shown in FIG. 9B, when the bottom envelope signal is received by the amplifier 340, the amplifier 340 subtracts the bias from the bottom envelope signal so that the minimum value of the bottom envelope signal is close to the reference level.

Figure 9C:
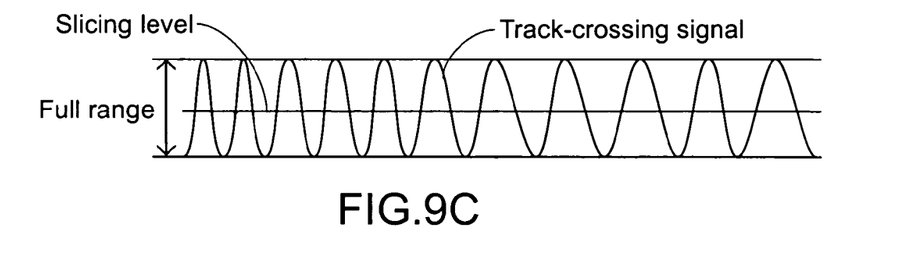

According to the peak-to-peak amplitude of the bottom envelope signal, a dynamically variable gain is generated from the auto gain control unit 330 to the amplifier 340. According to the dynamically variable gain, the bottom envelope signal is amplified by the amplifier 340, so that the top level and the bottom level of the amplified bottom envelope signal are maintained within a full range and close to the top and bottom boundaries. As shown in FIG. 9C, the amplified bottom envelope signal is considered as the track-crossing signal. According to another embodiment of the present invention, a fixed slicing level can be used, and the voltage value of the fixed slicing level is within the full range, as shown in FIG. 9C.

Figure 9D:
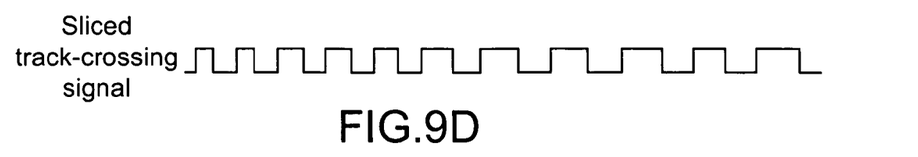

By comparing the track-crossing signal with a slicing level, which lies within the full range, the track-crossing signal is processed into a sliced track-crossing signal, as is shown in FIG. 9D.

FIGS. 10A, 10B, 10C, 10D and 10E are timing waveform diagrams illustrating related signals processed in the track-crossing signal generator of FIG. 7 and FIG. 8, in which a deep defect area is present on the disc track.

Figure 10A:
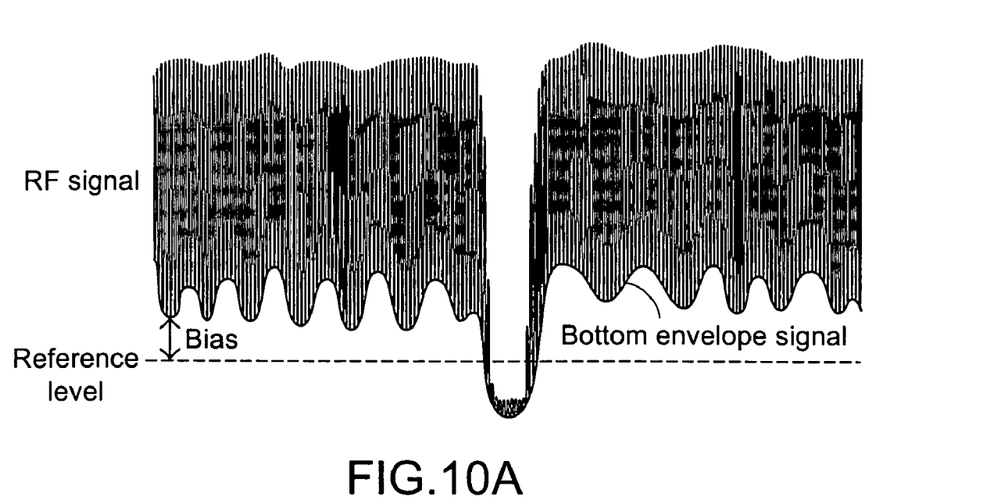
FIGS. 10A, 10B, 10C, 10D and 10E are timing waveform diagrams illustrating related signals processed in the track-crossing signal generator of FIG. 7 and FIG. 8, in which a deep defect area is present on the disc track.

As shown in FIG. 10A, when the optical pickup head jumps from one track to another track, the bottom envelope signal outputted from the bottom envelope detecting unit 310 is varied with change of the focusing position of the laser beam on the optical disc. In a case that the optical pickup head is moved along a track having a deep defect area with no reflection, the bottom envelope signal abruptly drops down to be below the predetermined second threshold value.

Figure 10B:
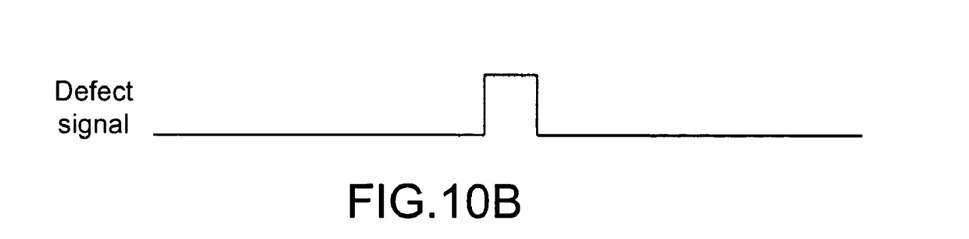

As shown in FIG. 10B, a defect signal is generated from the defect detector 320 when the optical pickup head is moved along the track having the deep defect area. From the beginning to the end of the defect signal, the bias outputted from the bias tracking unit 350 and the gain value outputted from the auto gain control unit 330 are kept unchanged.

Figure 10C:
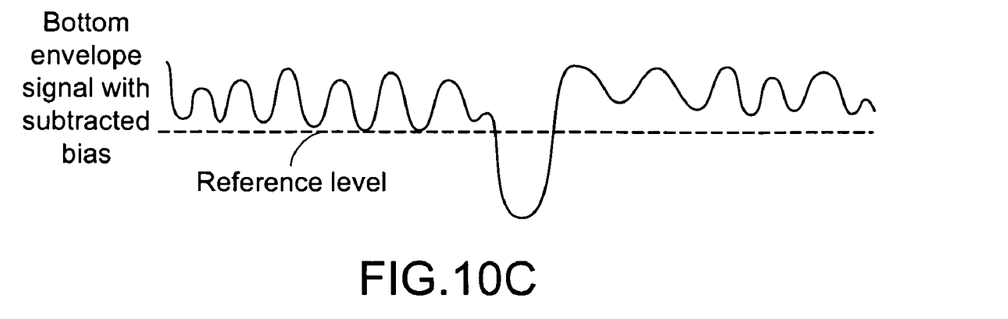

As shown in FIG. 10C, when the bottom envelope signal is received by the amplifier 340, the amplifier 340 subtracts the bias from the bottom envelope signal so that the minimum value of the bottom envelope signal excluding the deep defect area is close to the reference level.

Figure 10D:
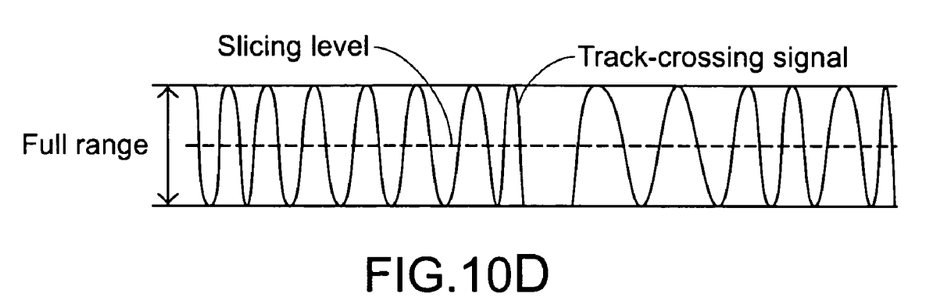

According to the peak-to-peak amplitude of the bottom envelope signal, a dynamically variable gain is generated from the auto gain control unit 330 to the amplifier 340. According to the dynamically variable gain, the bottom envelope signal is amplified by the amplifier 340, so that the top level and the bottom level of the amplified bottom envelope signal are kept within a full range and close to the top and bottom boundaries. As shown in FIG. 10D, the amplified bottom envelope signal is considered as the track-crossing signal. Since the bias outputted from the bias tracking unit 350 and the gain value outputted from the auto gain control unit 330 are kept unchanged from the beginning to the end of the defect signal, the amplified bottom envelope signal excluding the deep defect area lies within the full range and close to the top and bottom boundaries. As a consequence, the track-crossing signal would be accurately generated.

Figure 10E:
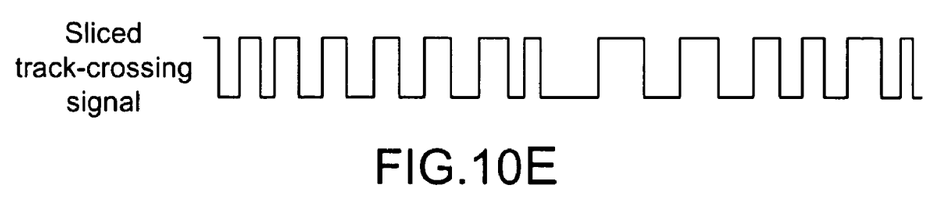

By comparing the track-crossing signal with a slicing level, which lies within the full range, the track-crossing signal is processed into a sliced track-crossing signal, as shown in FIG. 10E.

FIGS. 11A, 11B, 11C, 11D and 11E are timing waveform diagrams illustrating related signals processed in the track-crossing signal generator of FIG. 7 and FIG. 8, in which a bright defect area is present on the disc track.

Figure 11A:
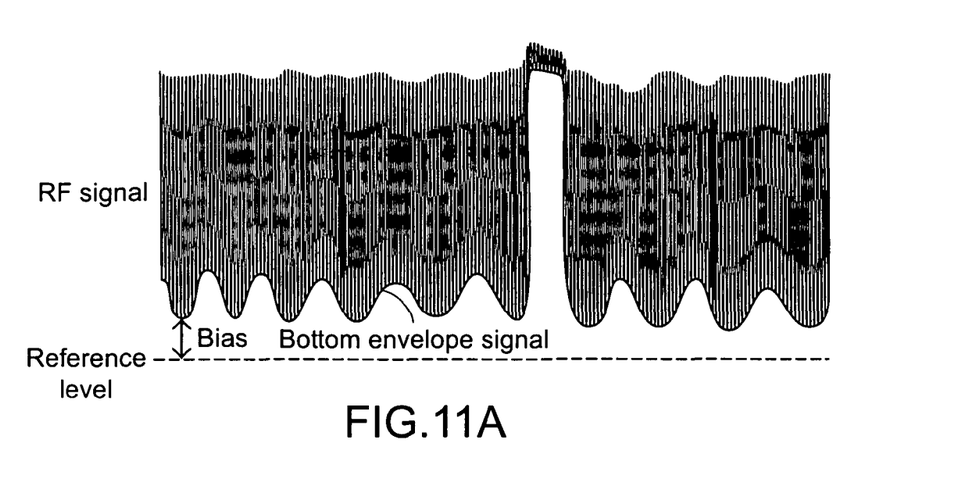
FIGS. 11A, 11B, 11C, 11D and 11E are timing waveform diagrams illustrating related signals processed in the track-crossing signal generator of FIG. 7 and FIG. 8, in which a bright defect area is present on the disc track.

As shown in FIG. 11A, when the optical pickup head jumps from one track to another track, the bottom envelope signal outputted from the bottom envelope detecting unit 310 is varied with change of the focusing position of the laser beam on the optical disc. In a case that the optical pickup head is moved along a track having a bright defect area with strong reflection, the bottom envelope signal abruptly rise up to be far from the reference level.

Figure 11B:
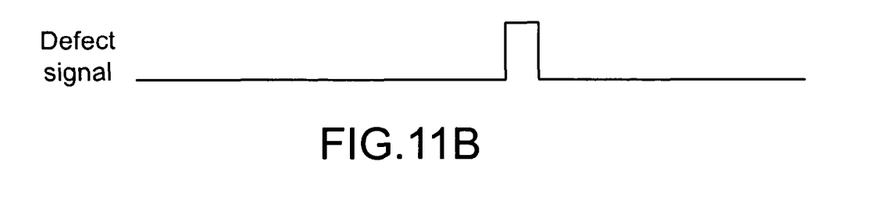

As shown in FIG. 11B, a defect signal is generated from the defect detector 320 when the optical pickup head is moved along the track having the bright defect area. From the beginning to the end of the defect signal, the bias outputted from the bias tracking unit 350 and the gain value outputted from the auto gain control unit 330 are kept unchanged.

Figure 11C:
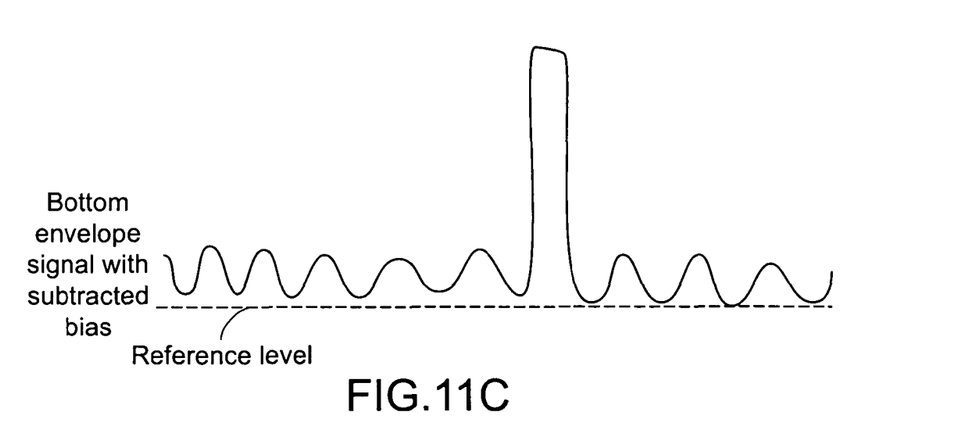

As shown in FIG. 11C, when the bottom envelope signal is received by the amplifier 340, the amplifier 340 subtracts the bias from the bottom envelope signal so that the minimum value of the bottom envelope signal excluding the bright defect area is close to the reference level.

Figure 11D:
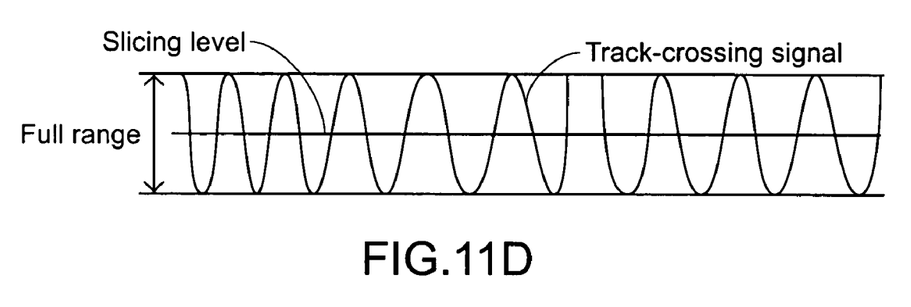

According to the peak-to-peak amplitude of the bottom envelope signal, a dynamically variable gain is generated from the auto gain control unit 330 to the amplifier 340. According to the dynamically variable gain, the bottom envelope signal is amplified by the amplifier 340, so that the top level and the bottom level of the amplified bottom envelope signal are maintained within a full range and close to the top and bottom boundaries. As shown in FIG. 11D, the amplified bottom envelope signal is considered as the track-crossing signal. Since the bias outputted from the bias tracking unit 350 and the gain value outputted from the auto gain control unit 330 are kept unchanged from the beginning to the end of the defect signal, the amplified bottom envelope signal excluding the bright defect area lies within the full range. As a consequence, the track-crossing signal would be accurately generated.

Figure 11E:
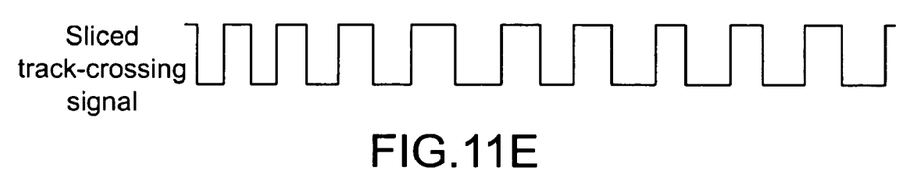

By comparing the track-crossing signal with a slicing level, which lies within the full range, the track-crossing signal is processed into a sliced track-crossing signal, as is shown in FIG. 11E.

It is noted that, however, those skilled in the art will readily observe that numerous modifications and alterations may be made while retaining the teachings of the invention. For example, the bias tracking unit 350 may be dispensed with. The use of the bottom envelope detecting unit 310, the defect detector 320, the auto gain control unit 330 and the amplifier 340 can generate the track-crossing signal with an offset. This track-crossing signal is still accurately obtained when optical pickup head is moved along a track having a deep or bright defect area.

The track-crossing signal generator of the present invention can be implemented by digitalized circuitry. For example, the RF signal can be converted into a digital format by an analog-to-digital converter before inputted into the bottom envelope detecting unit 310. The bottom envelope detecting unit 310, the defect detector 320, the auto gain control unit 330, the amplifier 340 and the bias tracking unit 350 included in the track-crossing signal generator can be implemented by digitalized circuitry. As a consequence, the track-crossing signal generator of the present invention occupies reduced layout space of the integrated chip and is more cost-effective when compared with the prior art.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A track-crossing signal generator for use in an optical disc drive, comprising:
    a bottom envelope detecting unit for receiving a radio frequency signal, and outputting a bottom envelope signal;
    a defect detector electrically connected to the bottom envelope detecting unit for receiving the bottom envelope signal, and generating a defect signal when a defect area is formed on a disc track;
    an auto gain control unit electrically connected to the bottom envelope detecting unit for receiving the bottom envelope signal and dynamically adjusting a gain value according to an amplitude of the bottom envelope signal;
    an amplifier electrically connected to the bottom envelope detecting unit and the auto gain control unit for receiving the bottom envelope signal; and
    a bias tracking unit electrically connected to the defect detector and the amplifier for generating a bias to the amplifier according to the radio frequency signal or the bottom envelope signal and a reference level;
    wherein the amplifier subtracts the bias from the bottom envelope signal and dynamically adjusts the bottom envelope signal according to the gain value when the bias is received by the amplifier, thereby amplifying the bottom envelope signal and outputting the amplified bottom envelope signal as a track-crossing signal.

2. The track-crossing signal generator according to claim 1 wherein from the beginning to the end of the defect signal, the gain value outputted from the auto gain control unit and the bias outputted from the bias tracking unit are kept unchanged.

3. The track-crossing signal generator according to claim 1 wherein the defect detector comprises a first threshold value and a second threshold value, the first threshold value being larger than the second threshold value, wherein the defect detector generates the defect signal when the bottom envelope signal is larger than the first threshold value or smaller than the second threshold value.

4. A method of generating a track-crossing signal in an optical disc drive, comprising:
    providing a radio frequency signal;
    generating a bottom envelope signal according to the radio frequency signal;
    generating a defect signal when the bottom envelope signal is larger than a first threshold value or smaller than a second threshold value, wherein the first threshold value is larger than the second threshold value; and
    generating a bias according to the radio frequency signal or the bottom envelope signal and a reference level;
    subtracting the bias from the bottom envelope signal; and
    dynamically adjusting the bottom envelope signal and outputting the adjusted bottom envelope as a track-crossing signal.

5. The track-crossing signal generating method according to claim 4, wherein the step of dynamically adjusting the bottom envelope signal comprises dynamically adjusting a gain value according to the amplitude of the bottom envelope signal, and dynamically adjusting the bottom envelope signal according to the gain value.

6. The track-crossing signal generating method according to claim 5 wherein the gain value and the bias are kept unchanged from the beginning to the end of the defect signal, so that the top level and the bottom level of the track-crossing signal are maintained within a full range and close to the top and bottom boundaries.

7. The track-crossing signal generating method according to claim 6 further comprising a step of comparing the track-crossing signal with a slicing level, thereby generating a sliced track-crossing signal, wherein the magnitude of the slicing level lies within the full range and close to the top and bottom boundaries and the slicing level is either constant or variable with the bottom envelope signal.

8. A track-crossing signal generator for use in an optical disc drive, comprising:
   a bottom envelope detecting unit for receiving a radio frequency signal, thereby outputting a bottom envelope signal;
   a defect detector for receiving the radio frequency signal, and generating a defect signal when a defect area is formed on a disc track;
   an auto gain control unit electrically connected to the bottom envelope detecting unit for receiving the bottom envelope signal and dynamically adjusting a gain value according to the amplitude of the bottom envelope signal;
   an amplifier electrically connected to the bottom envelope detecting unit and the auto gain control unit for receiving the bottom envelope signal; and
   a bias tracking unit electrically connected to the defect detector and the amplifier for generating a bias to the amplifier according to the radio frequency signal or the bottom envelope signal and a reference level;
   wherein the amplifier subtracts the bias from the bottom envelope signal and dynamically adjusts the bottom envelope signal according to the gain value when the bias is received by the amplifier, thereby amplifying the bottom envelope signal and outputting the amplified bottom envelope signal as a track-crossing signal.

9. The track-crossing signal generator according to claim 8 wherein from the beginning to the end of the defect signal, the gain value outputted from the auto gain control unit and the bias outputted from the bias tracking unit are kept unchanged.

* * * * *